United States Patent

Sakai et al.

[11] Patent Number: 5,778,134
[45] Date of Patent: Jul. 7, 1998

[54] APPARATUS FOR RECORDING AND REPRODUCING IMAGE INFORMATION IN A RECORDING MEDIUM WHEREIN SCANNING PROBES ARE CONTROLLED BASED ON EDITING INFORMATION

[75] Inventors: Kunihiro Sakai, Isehara; Takahiro Oguchi, Yamato; Akihiko Yamano; Shunichi Shido, both of Sagamihara, all of Japan

[73] Assignee: Canon Kabushiki Kaisha, Tokyo, Japan

[21] Appl. No.: 711,306

[22] Filed: Sep. 3, 1996

Related U.S. Application Data

[63] Continuation of Ser. No. 165,897, Dec. 14, 1993, abandoned.

[30] Foreign Application Priority Data

Dec. 21, 1992 [JP] Japan .................. 4-340753

[51] Int. Cl.$^6$ ......................................... H04N 5/76
[52] U.S. Cl. .................. 386/46; 386/52; 358/906
[58] Field of Search ........................... 386/46, 52, 55, 386/125, 124, 107, 117, 48, 68, 82; 358/906, 909.1; 369/126; H04N 5/76

[56] References Cited

U.S. PATENT DOCUMENTS

| | | | |
|---|---|---|---|
| 4,361,849 | 11/1982 | Bolger ......................... | 358/312 |
| 4,425,587 | 1/1984 | Kurata ......................... | 358/312 |
| 4,611,248 | 9/1986 | Honjo et al. ................ | 358/312 |
| 4,688,106 | 8/1987 | Keller et al. ................ | 386/125 |
| 4,970,608 | 11/1990 | Fukuda et al. .............. | 360/14.1 |
| 5,317,533 | 5/1994 | Quate et al. ................. | 365/151 |
| 5,339,165 | 8/1994 | Inoue et al. ................. | 358/312 |
| 5,373,494 | 12/1994 | Kawagishi et al. .......... | 369/126 |
| 5,389,475 | 2/1995 | Yanagisawa et al. ........ | 369/126 |
| 5,394,388 | 2/1995 | Hatanaka et al. ............ | 369/126 |
| 5,446,599 | 8/1995 | Lemelson ..................... | 358/906 |

FOREIGN PATENT DOCUMENTS

| | | |
|---|---|---|
| 8907256 | 8/1989 | European Pat. Off. . |
| 0382192A1 | 8/1990 | European Pat. Off. . |
| 0473516A2 | 3/1992 | European Pat. Off. . |
| 60-022885 | 2/1985 | Japan . |

*Primary Examiner*—Thai Tran
*Assistant Examiner*—Huy Nguyen
*Attorney, Agent, or Firm*—Fitzpatrick, Cella, Harper & Scinto

[57] ABSTRACT

Apparatus for storing image information in a recording medium, and outputting image information based on editing information includes dividing structure for dividing input image information. A memory is provided for storing each of the divided input image information. The memory includes a plurality of probes, each probe being arranged to oppose the recording medium. The memory also includes scanning structure for relatively moving the probes and the recording medium so that the probes scan a surface of the recording medium. The memory also includes recording and reproducing structure for recording the divided information on the recording medium by using the probes, and for reproducing the divided information recorded on the recording medium. Control circuitry is provided for controlling the scanning structure according to scanning procedures for each of the probes based on the editing information.

2 Claims, 5 Drawing Sheets

APPARATUS FOR RECORDING AND REPRODUCING IMAGE INFORMATION IN A RECORDING MEDIUM WHEREIN SCANNING PROBES ARE CONTROLLED BASED ON EDITING INFORMATION

This application is a continuation of application Ser. No. 08/165,897, filed Dec. 14, 1993, abandoned.

BACKGROUND OF THE INVENTION

1. Field of the Invention

The present invention relates to an image signal processing apparatus and, more particularly, to an image signal processing apparatus which is incorporated in, e.g., a video camera recorder, and performs recording, edit, and reproduction of time-serially input image signals.

2. Related Background Art

In recent years, the use of memory materials is the nucleus of the electronics industries such as computers and their peripheral devices, video disks, digital audio disks, and the like, and the development of these materials has been very active. Conventionally, magnetic memories and semiconductor memories, which use magnetic materials and semiconductors as base materials, are chief products. However, along with progress of the laser technologies, low-cost, high-density recording media based on optical memories using organic thin films such as organic dyes, photopolymers, and the like have become available.

Furthermore, in recent years, a scanning tunnel microscope (to be abbreviated as an STM hereinafter) which allows direct observation of the electron structure of sample surface atoms with a remarkably high resolution has been developed (G. Binnig et. al., Phys. Rev. Lett., 49 (1982) 57), and efforts have been made to put into practical use a memory system which can realize ultra high-density recording/reproduction in atomic or molecular size by utilizing the principle of the STM.

The STM utilizes a phenomenon that a tunnel current flows according to a voltage applied between a probe tip and a medium surface when a probe electrode approaches to a distance of about 1 nm or less from the medium surface. This current is very sensitive to a change in distance between the probe tip and the medium surface. When the probe is scanned to maintain a constant tunnel current, various kinds of information associated with all charge clouds in real space can be read as well. The STM is applied not only to analysis of conductive materials but also to structural analysis of thin insulating films formed on the surfaces of conductive materials. In either case, the resolution in the planar direction is as high as about 0.1 nm. The above-mentioned ultra high-density memory adopts the remarkably high spatial resolution of the STM technique. That is, the memory records information by giving a physical deformation or a change in electron state of the medium surface, and reproduces the information by scanning the probe.

For example, when a pulse voltage (e.g., a pulse height value of 3 to 8 V, a pulse width of 1 to 100 μs) is applied between the medium and the probe, a very small hole (e.g., a diameter of about 4 nm) can be formed on a graphite surface as a recording bit, or a very small projection (e.g., a diameter of about 10 nm) can be formed on a metal surface such as Au as a recording bit. Japanese Laid-Open Patent Application Nos. 63-161552, 63-161553, and the like disclose a method, which uses, as a recording layer, a material having a memory effect with respect to switching characteristics of a change in conductivity, e.g., a thin film layer of π it electron-based organic compound or a chalcogenide, and performs recording/reproduction using the STM. According to this method, if the recording bit size is 10 nm, high-density, large-capacity recording/reproduction at a density as high as 1 Tera bit/cm$^2$ is realized. Furthermore, as a probe electrode support/displacement mechanism, a cantilever-shaped mechanism (Japanese Laid-Open Patent Application No. 62-281138) is known, which mechanism allows formation and integration of a large number of probe units on an Si substrate pre-formed with read/write circuits.

On the other hand, recently, digital image information is increasingly used in various fields such as televisions, VTRs, copying machines, and the like. The reasons for such a tendency include advances in of recent digital technologies, and pursuit of high image quality at the commercial product level. Since digital information is used, various functions which cannot be added in an analog system can be added.

An image signal, especially, dynamic image information, is conventionally recorded on a silver chloride film, a magnetic tape, a magnetic disk, an optical disk, and the like. In these recording media, temporally continuous image information is continuously recorded on a recording medium in both an analog system and a digital system, and is reproduced in the same procedure as in recording, except for a fast forward operation, reversal reproduction, and the like. Even in the case of the fast forward operation or reversal reproduction, the entire time base is merely reversed or compressed/expanded, and the correlation (positional relationship) on the time base is preserved. Therefore, recorded information and reproduced information always are similar as far as the time base is concerned.

On the other hand, in a normal recording/reproduction method of an image signal, information with redundant data (larger than necessary information) is recorded, and information which is arranged by edit/modification processing after redundancy is removed therefrom is reproduced. The edit operation includes, for example, delete processing, sort processing, and copy processing. At this time, except for a method of physically cutting and pasting a medium, the similarity between recorded information and reproduced information on the time base is preserved in a conventional recording/reproduction mechanism, as has been described above. Therefore, the edited/modified information must be transferred to and recorded on another recording region, more specifically, another recording medium.

However, a recorded image deteriorates when initially recorded information (to be referred to as primary recorded information hereinafter for the sake of simplicity) is reproduced, and a modified reproduction signal is recorded again (information to be recorded in this case will be referred to as secondary recorded information). When information is partially deleted, although no processing is required except for data to be deleted, the process of reproducing primary recorded information, and re-recording the reproduced primary recorded information as secondary recorded information is necessary since data to be reproduced must be continuously recorded on a recording medium. This prolongs the edit time, and disturbs a simple edit operation.

In a conventional dynamic image recording/reproduction apparatus (video camera recorder or video recorder), at least two video camera recorders or video recorders are required as an apparatus for reproducing primary information and an apparatus for recording secondary information in a video edit operation. Of course, signal lines of these video recorders must be connected to allow the edit operation. It is difficult for amateur users or home users to prepare these apparatuses and to permanently set these connections, resulting in a troublesome edit process.

Of course, the above-mentioned object can be achieved by adding a mechanism for recording image information and controlling a reproduction procedure using a semiconductor memory which allows easy random access. However, such a memory is limited to an application to dynamic image information for a short period of time in terms of the recording density, volume, cost, and the like, and is used in only relatively large-scale apparatuses such as computers, work stations, and the like.

SUMMARY OF THE INVENTION

It is an object of the present invention to provide an image processing apparatus, which can solve the above-mentioned problems, and can easily record and edit a large amount of image signals.

In order to achieve the above object, there is provided an image signal processing apparatus for temporarily storing image information, and outputting the information after signal processing, being provided with:

dividing means for dividing the input image information;

memory means which stores the each divided information and including: a plurality of probe electrodes; a recording medium arranged to oppose the plurality of probe electrodes; scanning means for moving the probe electrodes relative to the recording medium, so that the probe electrodes scan a surface of the recording medium; and voltage application means for applying a voltage between the recording medium and each of the plurality of probe electrodes so as to record the divided information in each of scanning regions on the recording medium of the plurality of probes, and to reproduce the divided image information recorded in each of the scanning regions; and control means for controlling the scanning means of the memory means so as to edit and output the image information.

In order to achieve the above object, there is also provided a video camera recorder for inputting/outputting image information, being provided with:

image input means;

dividing means for dividing image information input by the image input means;

memory means which stores the each divided information and including: a plurality of probe electrodes; a recording medium arranged to oppose the plurality of probe electrodes; scanning means for moving the probe electrodes relative to the recording medium, so that the probe electrodes scan a surface of the recording medium; and voltage application means for applying a voltage between the recording medium and each of the plurality of probe electrodes so as to record the divided information in each of scanning regions on the recording medium of the plurality of probes, and to reproduce the divided image information recorded in each of the scanning regions; and control means for controlling the scanning means of the memory means so as to edit and output the image information.

According to the present invention, a memory, which reproduces a signal by scanning a probe like in an ultra high-density compact memory adopting the STM technique, is used as a temporary storage area of an image signal, and when recorded image information is read out, the probe scanning operation is controlled on the basis of a procedure stored or described in advance in another region.

As a result, when arbitrary regions on a medium on which an image signal is recorded are scanned in an arbitrary order, image signals subjected to desired edit/modification processing can be reproduced. In other words, the present invention can provide an image signal processing apparatus which can simultaneously edit and reproduce recorded data in a single apparatus.

Furthermore, the edit content, i.e., the arrangement of reproduction information can be easily changed by rewriting data associated with a series of probe scanning procedures. At this time, image information is held in an initially recorded state, i.e., as primary recorded information. Since no secondary recorded information need be generated and re-recorded in the edit processing, an image will not deteriorate even after a plurality of number of times of edit operations. For example, even when image information is partially deleted, the required process is only modification of a reproduction scanning procedure. Since primary information need not be actually deleted, and recorded information which is not deleted need not be transferred and re-recorded, the edit process time can be shortened, and the edit process can be simplified.

When the image signal processing apparatus with the above-mentioned functions is arranged in a video camera recorder or a video recorder, an apparatus having a simple edit function without causing deterioration of image quality can be obtained. It is easy to reduce, in size, a portion for storing or describing the probe scanning procedure, and even if this portion is added, the apparatus size does not increase. Since this apparatus requires neither generation nor recording of secondary recorded information, an edit operation can be realized in a stand-alone apparatus. As a result, operability in the edit process can be improved, and the cost and size of the image recording/reproduction system including an edit function as a whole can be reduced.

DETAILED DESCRIPTION OF THE PREFERRED EMBODIMENTS

The present invention will be described in detail hereinafter with reference to its embodiments.

Figure 1:
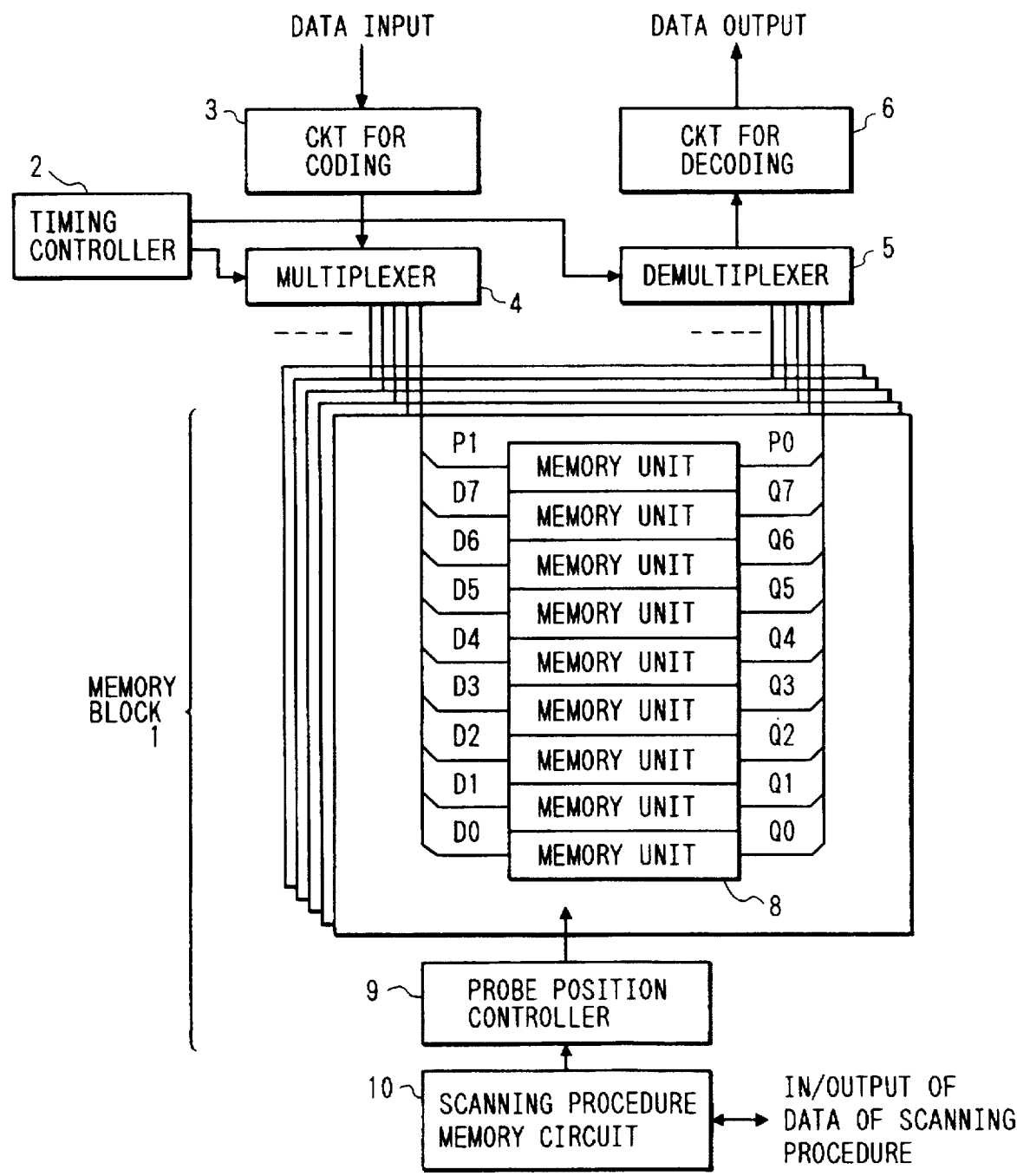
FIG. 1 is a block diagram showing an embodiment of an arrangement of an image signal processing apparatus according to the present invention.

FIG. 1 is a block diagram showing a schematic arrangement of an image signal processing apparatus according to an embodiment of the present invention. The apparatus shown in FIG. 1 includes a memory block 1, and the detailed arrangement of the memory block 1 will be described in detail later with reference to FIG. 2. The apparatus also includes a timing controller 2, a circuit 3 for coding input data, a multiplexer 4, a demultiplexer 5, a circuit 6 for decoding an encoded signal, memory units 8 constituting the memory block, a probe position controller 9 for controlling the probe scanning position, and a scanning procedure memory circuit 10 for storing probe scanning procedure data which is input prior to reproduction in a memory device of the present invention. The probe position controller 9 controls the probe scanning position in a reproduction mode in accordance with the recorded content of the memory circuit 10.

The operation of the apparatus shown in FIG. 1 will be described below.

Image data to be input comprises a plurality of frames. The "frame" is a minimum data unit of image data. After the image data is encoded by the circuit 3, the data is divided by the multiplexer 4 in units of frames in correspondence with the number of memory units, and the divided data are respectively distributed to the predetermined memory units in the memory block 1. The memory units which received the distributed image data record the data. In the reproduction mode, the distributed data are restored by the demultiplexer 5 to an original continuous data string, and the data string is output via the circuit 6. When a real-time continuous image or dynamic image is to be processed, a buffer function is provided to both the data input and output units, i.e., the circuits 3 and 6 so as to prevent data loss during dead time (e.g., moving time of a probe between adjacent tracks or recording regions) generated due to a mechanism in a recording or reproduction process by scanning the probe. The multiplexer 4 and the demultiplexer 5 are controlled by the timing controller 2.

Figure 2:
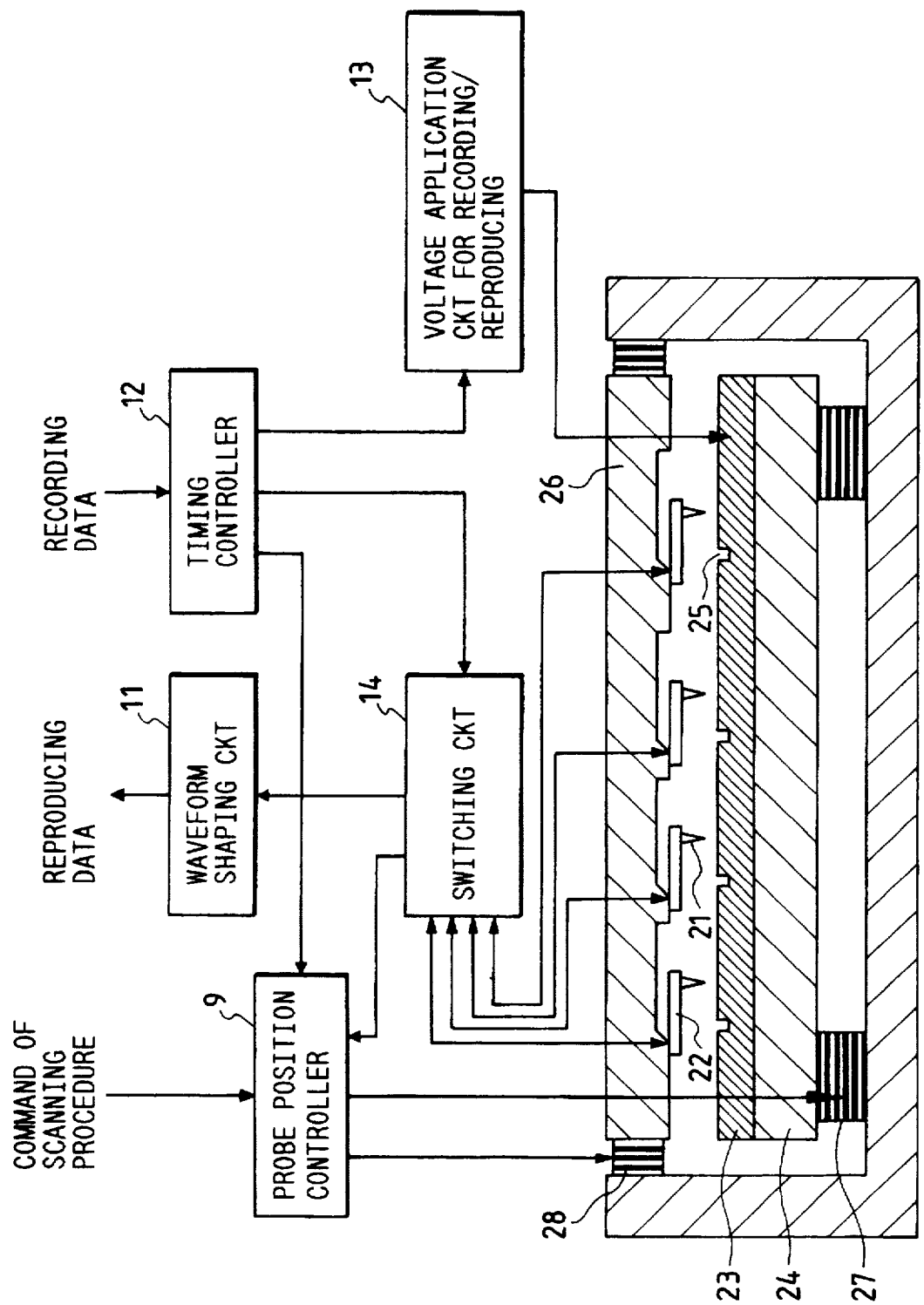
FIG. 2 is a schematic diagram showing the details of a memory block shown in FIG. 1.

The memory block 1 has a feature of recording/reproducing information on/from a desired position or region on the recording medium using the scanning probe. This embodiment uses the memory block whose arrangement is shown in FIG. 2. The memory block will be described below with reference to FIG. 2. Referring to FIG. 2, a plurality of probe electrodes 21 are respectively supported by cantilevers 22 each consisting of an elastic member, and are arranged in the vicinity of a recording medium 23. One memory unit is constituted by a set of one probe electrode 21 and the recording medium 23, which oppose each other. The recording medium 23 is supported on a supporting substrate 24, and guide grooves 25 used for selecting a recording region and realizing tracking upon scanning are formed on the surface of the medium 23. The probe position controller 9 is a circuit for controlling the probe/medium interval (distance in the Z direction), and probe scanning (movement and position in the X and Y directions), and is connected to driving elements 27 and 28 each comprising a piezoelectric member.

Information is recorded on a thin film medium by an electrical method between the probe and the medium, and is reproduced by measuring a physical phenomenon caused by an approach of the probe to the medium. More specifically, in this embodiment, an SOAZ dye organic thin film (two-layered film) stacked on a gold electrode as a recording medium disclosed in Japanese Laid-Open Patent Application Nos. 63-161552 and 63-161553 is used as the recording medium 23. A recording bit is written on the medium by a pulse voltage generated by a voltage application circuit 13, a probe current is detected, and recorded image information is reproduced via a switching circuit 14 and a waveform shaping circuit 11.

Note that the probe current value is also input to the probe position controller as Z-direction position control information. A timing controller 12 is connected to the probe position controller 9, the voltage application circuit 13 for recording/reproducing, and the switching circuit 14, and manages time sharing of data and distribution of recording signals to the probes.

A lever-shaped multi probe unit including the probe electrodes used in this embodiment is manufactured as follows. A 0.3-μm thick $SiO_2$ film is formed on the surface of an Si substrate by thermal oxidation, and a plurality of lever shapes each having a length of 100 μm and a width of 20 μm are patterned. Then, an electrical signal wiring pattern for the probe electrodes is formed, and anisotropic etching is performed using an aqueous KOH solution from the rear surface side of the substrate, thus forming cantilevers. Subsequently, 5-μm high probe electrodes 21 are formed on the tips of the levers by an electron beam deposition method of, e.g., carbon, thereby forming the multi probe unit on a probe unit substrate 26.

The memory block manufactured, as described above, performs recording at a density of 1,920 probes, an X-direction scanning frequency of 500 Hz, a main scanning width of 1 μm, a bit diameter of 5 nm, and a bit interval of 10 nm, and has a recording/reproduction speed of 192 Mbps as a whole and 100 kHz per unit.

When the above-mentioned image signal processing apparatus according to the embodiment of the present invention is used, an edit operation of image information in the reproduction mode can be easily performed. More specifically, as will be described below, after image data is temporarily stored in the memory block, an edit operation and reproduction output can be simultaneously realized by controlling probe scanning using a procedure and scanning regions different from those in the recording mode.

Figure 3A:
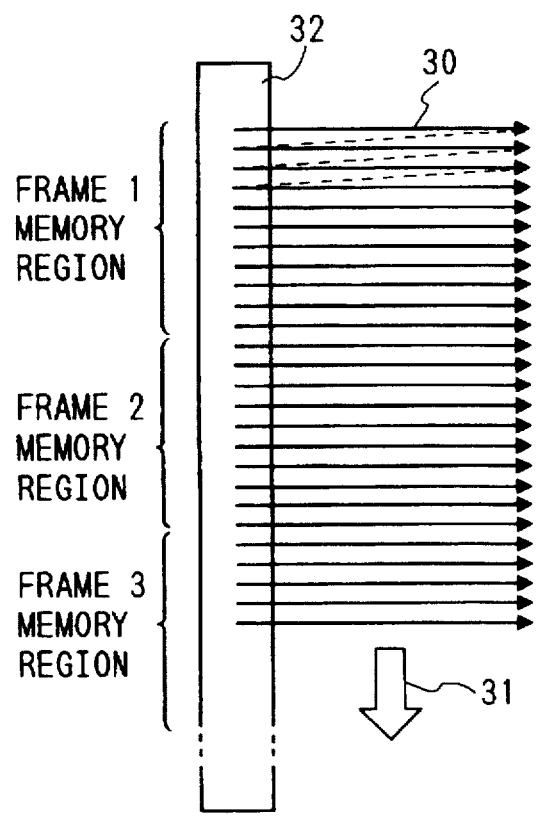
FIGS. 3A and 3B are views showing an edit process (delete processing) of a stored image.
Figure 3B:
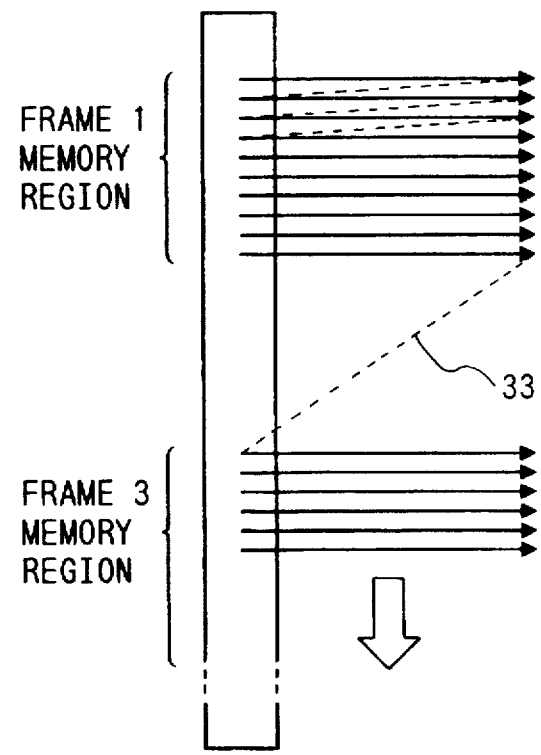

FIGS. 3A and 3B show a case wherein a certain image portion is deleted and skipped in edit processing. FIGS. 3A and 3B respectively illustrate scanning states of a single probe on the recording medium in the recording and reproduction modes. Note that other probes are also simultaneously scanned in the same manner as the illustrated probe. FIGS. 3A and 3B illustrate a main scanning line 30 of the probe, and an arrow 31 indicating the sub-scanning direction. Also, these drawings show a guide groove 32 used for selecting a recording region, and performing tracking upon scanning. In the recording mode (FIG. 3A), recording bits are formed on the recording medium while main-scanning the probe.

At this time, as shown in FIG. 3A, dynamic image signals which are continuously input to have frame numbers 1, 2, 3, . . . , are written in turn on the recording regions of the recording medium. In the reproduction mode, when the recording signals are read out by scanning on the medium in the same probe scanning procedure as in the recording mode, the recorded image signals are reproduced without being edited. However, when a scanning region jumping operation 33 is performed, as shown in FIG. 3B, image information from which an unnecessary frame is deleted can be obtained.

When reproduction is performed while repeating the above-mentioned delete operation at an equal interval, the obtained image signals are temporally thinned out, thus obtaining a high-speed reproduced image.

FIGS. 3A and 3B illustrate a forward jumping operation from frame 1 to frame 3. Of course, the scanning region jumping operation 33 may be performed in a direction opposite to the recording order. As a result, in the case of recording/reproduction of dynamic image signals, reproduced information which is re-ordered on the time base is output, thus obtaining a reversely reproduced image.

Of course, an arbitrary recording region may be scanned a plurality of times. When a certain image is to be repetitively output a plurality of times during a series of dynamic image reproduction operations, since a recorded image signal and a reproduced output signal have a one-to-one correspondence therebetween in a conventional apparatus, copying processing of an image signal is required as needed. However, according to the present invention, the same effect as the conventional copy processing can be obtained by re-scanning the probe. On the other hand, an arbitrary frame memory region is repetitively probe-scanned for a predetermined period of time, thus obtaining a still image as an image signal to be reproduced.

Figure 4:
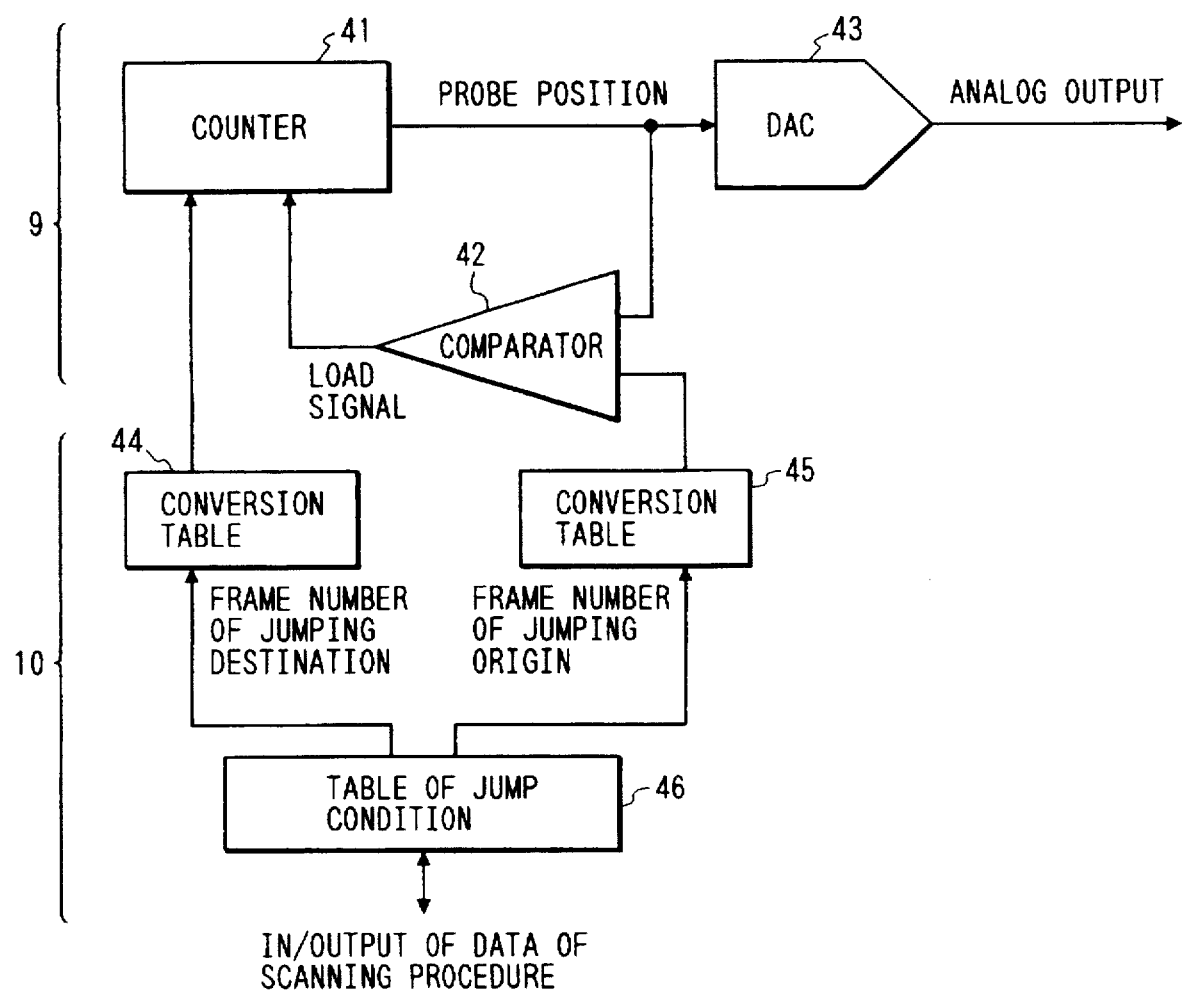
FIG. 4 is a block diagram showing an arrangement of a circuit for managing and executing a scanning region jumping operation.

Note that the scanning region jumping operation 33 is managed and executed by the scanning procedure memory circuit 10 and the probe position controller 9 shown in FIG. 1. These circuits will be described below with reference to FIG. 4. Referring to FIG. 4, the probe position controller 9 includes a loadable up/down counter 41, a comparator 42, and a D/A converter 43. The scanning procedure memory circuit 10 includes tables 44 and 45 for converting a frame number into a probe address (counter value), and a table 46 which stores frame numbers of jumping origins and frame numbers of jumping destinations as a scanning region jumping condition. In the table 46, a user (editor) inputs (or records) desired scanning procedure data. In the reproduction mode, the probe position is determined by an increase/decrease in output from the counter 41 in a normal scanning operation. In this state, when the probe reaches a position coinciding with the address of the jumping origin obtained from the table 46, the counter 41 loads the address value of the jumping destination in response to a signal generated by the comparator 42, and the probe moves to a desired position. The table 46 increments an internal pointer by one to output the next jumping condition. The above-mentioned operation realizes the scanning region jumping operation 33 shown in FIGS. 3A and 3B.

In this embodiment, the probe position management counter is used. For example, recording region address information may be described in a recording data string to be scanned by the probe, and may be read out in the reproduction mode, thereby detecting the absolute position of the probe simultaneous with reproduction of image data. This method is also suitable for the present invention.

Furthermore, when allocation table values for continuous image data are additionally recorded in a recording data string, the scanning procedure can be stored in the recording medium. More specifically, this method acquires the address of the next recording region to be accessed by the probe simultaneously with image data, and is an application of a conventional technique for recording/reproducing a file allocation table on/from a magnetic recording medium together with a data string when data files are divisionally managed on the magnetic recording medium. In the present invention, however, an operation for rewriting only the allocation table content without changing a data string of image signals is performed for the purpose of editing reproduction information. When the scanning region jumping condition table is separately arranged as in the above embodiment, the number of jumping operations is limited by the table capacity. However, when the above-mentioned method which also records probe access information in a recording data string is used, this limitation is relaxed. Therefore, this method is suitable for a case wherein the probe scanning region jumping operation is performed very frequently. Note that the region and method for recording the probe scanning procedure do not restrict the present invention at all.

Figure 5:
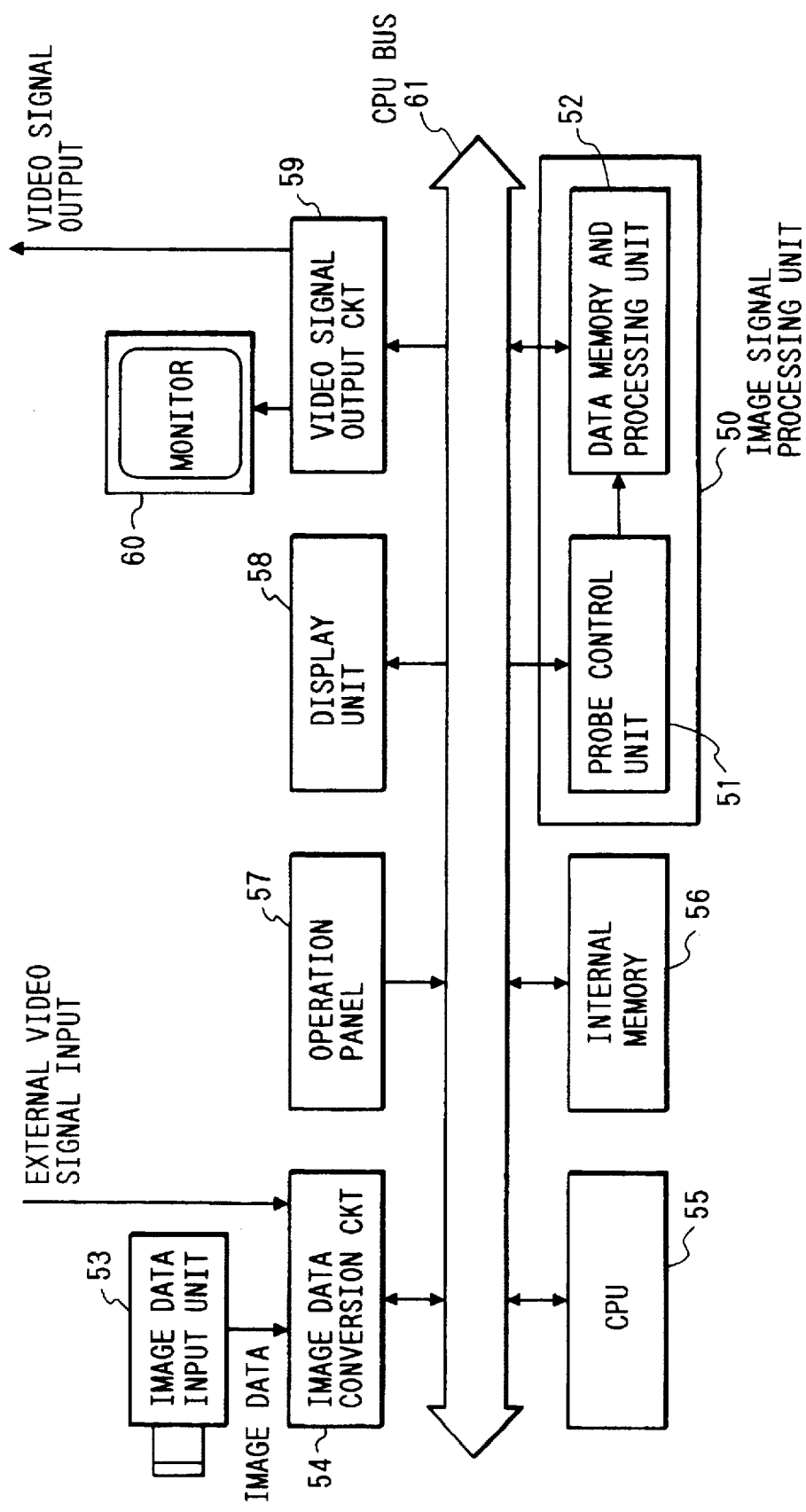
FIG. 5 is a block diagram showing an arrangement of a video camera recorder to which the image signal processing apparatus of the present invention is applied.

FIG. 5 is a block diagram showing a schematic arrangement of a video camera recorder according to the second embodiment of the present invention. The video camera recorder includes an image data input unit 53 comprising an optical system and a CCD, and an image data conversion circuit 54 for performing a CCD driving operation, digital conversion, level conversion, and the like. Input image data is transferred to and stored in an image signal processing apparatus 50. The video camera recorder also includes a CPU 55 for performing data acquisition, transfer, and calculations. The video camera recorder comprises, as peripheral circuits of the CPU 55, the image data input unit 50, the image data conversion circuit 54, a video signal output circuit 59, an internal memory 56 as a working area, an operation panel 57 used for setting an operation condition, and externally inputting a processing command, and a display unit 58 for confirming an operation condition and state. These units are connected to a bus 61 for transferring a control signal and data. The capacity of the memory block used in this embodiment is about 120 Gbytes, and allows recording of a color dynamic image for about an hour. Thus, this portable compact video camera recorder has a wide application range.

The above-mentioned image signal processing apparatus 50 has the same function as in the first embodiment. Prior to reproduction, an instruction (procedure book) associated with a reproduction procedure is input from the operation panel, and is recorded in a probe control unit 51. Thereafter, when a probe scanning operation is performed based on the input data in the reproduction mode, data stored in a data memory and processing unit 52 is subjected to edit processing such as delete processing, high-speed reproduction processing, reversal reproduction processing, copy processing, still processing, and the like, and the processed data is output as a video signal to a monitor 60 and an external apparatus.

When a plurality of procedures are described in advance, and are recorded in the probe control unit 51, an arbitrary one of these procedures can be selected using the display unit 58 and the operation panel 57 in the reproduction mode. Conventionally, when edit contents are different, recording media for reproduction corresponding in the number of pieces of secondary recorded information to be reproduced are required even when common primary recorded information is used. However, according to the present invention, a plurality of reproduction formats having different edit contents can be stored without increasing the amount of information to be stored. For example, when a broadcast program is recorded, a reproduction operation of the program by deleting only commercial portions broadcasted during the program, a reproduction operation of the program by extracting only the commercial portions, a high-speed reproduction operation (fast forward), and the like can be freely selected without being restricted by the storage capacity. Since the operation in the reproduction mode is simple, the above-mentioned function is very effective.

In the above description, the function of editing recorded image data in the reproduction mode has been exemplified. Also, image data can be edited in the recording mode. That is, attribute information corresponding to a signal to be input is recorded in the scanning procedure region (included in the probe control unit 51) simultaneously with or prior to image signal recording, and in the reproduction mode, the probe control unit 51 can determine and execute based on the attribute information whether or not the recorded signal is reproduced, and the priority order of reproduction.

In FIG. 5, the video camera recorder comprising the image signal processing apparatus is exemplified. Of course, the present invention may be applied to a video recorder. The arrangement of the video recorder is substantially the same as that of the video camera recorder, except for some components of the image data input unit 53, and the image data conversion circuit 54, and an image signal processing apparatus having the same function as that of the image signal processing apparatus 50 can be adopted. Thus, a video recorder having the above-mentioned edit function can be realized as in the video camera recorder.

According to the present invention, an image processing apparatus, which can easily obtain reproduction information subjected to edit processing such as re-arrangement of the reproduction order, partial deletion of information, and the like after image information is recorded, is obtained. Furthermore, when the apparatus has a compact memory portion, it can be assembled in a video recorder, a video camera recorder, or the like. As a result, a multi-functional, compact apparatus can be provided by adding a simple mechanism.

What is claimed is:

1. An apparatus for storing image information in a recording medium, and for outputting image information from the recording medium, comprising:

dividing means for dividing input image information;

memory means for storing each of the divided input image information, said memory means including:

a plurality of probes, each probe being arranged to oppose the recording medium;

scanning means for relatively moving said probes and the recording medium so that said probes scan a surface of the recording medium; and recording and reproducing means for recording the divided information on the recording medium by using said probes, and for reproducing the divided information from the recording medium using said probes; and control means including a writable memory for storing scanning procedures for said plurality of probes edited by a user, and for controlling said scanning means in accordance with the scanning procedures stored in said memory.

2. Apparatus according to claim 1, wherein said apparatus is incorporated in a video camera recorder.

* * * * *

UNITED STATES PATENT AND TRADEMARK OFFICE
CERTIFICATE OF CORRECTION

PATENT NO. : 5,778,134
DATED : July 7, 1998
INVENTOR(S) : KUNIHIRO SAKAI, ET AL.

It is certified that error appears in the above-indentified patent and that said Letters Patent is hereby corrected as shown below:

On the title page:
Item: [56] References Cited

```
insert --62-281138 12/1987 Japan
63-161553 7/1988 Japan
63-161552 7/1988 Japan-- insert --Physical Review Letters, Vol. 49, No. 1,
July 5, 1982, "Surface Studies By Scanning
Tunneling Microscopy" by G. Binning, H. Rohrer,
Ch. Gerber, and E. Weibel--.
```

Column 2

Line 14, "of" should be deleted.

Signed and Sealed this

Twenty-sixth Day of January, 1999

Attest:

Attesting Officer

*Acting Commissioner of Patents and Trademarks*